US008656279B2

(12) United States Patent
Haug

(10) Patent No.: US 8,656,279 B2
(45) Date of Patent: Feb. 18, 2014

(54) GLOBAL SETTINGS FOR THE ENABLEMENT OF CULTURE-BASED GESTURES

(75) Inventor: Tobias Haug, Reilingen (DE)

(73) Assignee: SAP AG, Walldorf (DE)

(*) Notice: Subject to any disclaimer, the term of this patent is extended or adjusted under 35 U.S.C. 154(b) by 227 days.

(21) Appl. No.: 12/967,528

(22) Filed: Dec. 14, 2010

(65) Prior Publication Data
US 2012/0151340 A1    Jun. 14, 2012

(51) Int. Cl.
*G06F 3/033* (2013.01)

(52) U.S. Cl.
USPC .......................................... 715/703; 715/863

(58) Field of Classification Search
None
See application file for complete search history.

(56) References Cited

U.S. PATENT DOCUMENTS

| | | | |
|---|---|---|---|
| 7,810,092 B1 * | 10/2010 | van Rietschote et al. ......... 718/1 |
| 2005/0212751 A1 | 9/2005 | Marvit et al. |
| 2007/0070081 A1 * | 3/2007 | Tang et al. .................... 345/591 |
| 2008/0059578 A1 * | 3/2008 | Albertson et al. ............. 709/204 |
| 2009/0027337 A1 * | 1/2009 | Hildreth ........................ 345/158 |
| 2009/0251471 A1 * | 10/2009 | Bokor et al. ................... 345/474 |
| 2010/0198579 A1 * | 8/2010 | Cunnington et al. ............. 704/3 |
| 2010/0277489 A1 * | 11/2010 | Geisner et al. ................. 345/581 |
| 2010/0306261 A1 | 12/2010 | Geisner et al. |
| 2011/0093820 A1 * | 4/2011 | Zhang et al. .................. 715/863 |
| 2011/0119640 A1 * | 5/2011 | Berkes et al. .................. 715/863 |
| 2011/0154266 A1 * | 6/2011 | Friend et al. ................... 715/863 |
| 2011/0169726 A1 * | 7/2011 | Holmdahl et al. ............. 345/156 |
| 2011/0173574 A1 * | 7/2011 | Clavin et al. .................. 715/863 |

FOREIGN PATENT DOCUMENTS

WO    WO 2008/084034    7/2008

OTHER PUBLICATIONS

European Search Report for EP 11 19 3207, dated Jun. 6, 2012.
David Pogue" "iPhone: The Missing Manual (section 2.1)" In: iPhone: The Missing Manual", Aug. 24, 2010, O'Reilly, XP055058453.
Summons to Attend oral proceedings in corresponding EP application No. 11193207.5 dated Apr. 25, 2013.
http://www.engadget.com/2010/05/28/toshiba-airswing-ui-puts-you-on-the-screen-with-your-date/, May. 28, 2010.
http://www.youtube.com/watch?v=7b4WAbMzonA&NR=1, Jun. 10, 2008.
http://www.youtube.com/watch?v=eP7flo-gsE, Jan. 5, 2010.
http://www.youtube.com/watch?v=g5KWvEOUYUI, Sep. 28, 20009.
http://www.youtube.com/watch?v=CWUcGgSolw4&feature=related, Mar. 13, 2007.

* cited by examiner

*Primary Examiner* — Phenuel Salomon
*Assistant Examiner* — Mahelet Shiberou
(74) *Attorney, Agent, or Firm* — Kenyon & Kenyon LLP

(57) ABSTRACT

A method of configuring a device to receive gesture inputs of a particular culture includes: responsive to a user request to adapt a device to gestures of a culture, assigning a data record representing cultural setting of the device to the culture, and responsive to the assigning the culture setting of the device, adopting a gesture recognizer of the device to the culture setting.

11 Claims, 3 Drawing Sheets

GLOBAL SETTINGS FOR THE ENABLEMENT OF CULTURE-BASED GESTURES

FIELD OF THE INVENTION

The present invention is generally directed to a gesture-based user interface. In particular, the present invention is directed to a method of global settings for culture-based gesture recognition.

BACKGROUND

Traditional user input devices such as keyboards and mice may be tethered to a device, and further, they may be universally specified without regards to a user's cultural background. For example, keyboards may be universally designed based on the English alphabet for all users. Recently, user input devices move toward un-tethered inputs such as touch screens. A touch screen may display a graphic user interface (GUI) for a user to interact with the GUI via the touch screen in manners similar to a mouse. For example, buttons may be displayed on a touch screen for the user to select and activate. On the other hand, touch screens also may be used to recognize simple gestures. For example, a touch screen may be used to sense a one-dimensional movement such as left-to-right swaps as an instruction for turning a web page. However, these gesture inputs, although less restrictive, are still based on their utility rather than on a user's cultural background.

Natural gestures also may be used to input user instructions. Human gestures may include hand gestures and/or body gestures. These natural gestures may be sensed by sensors such as video cameras. The sensor data may be further analyzed by a processor to detect these gestures. For example, multiple video cameras may be used to detect and interpret human gestures in three dimensional space. The interpretation of the human natural gestures may be used as input of instructions to a device executing software applications.

One advantage of using human natural gestures as an input command is that they are less restrictive and more natural to a user. Thus, the user may respond and command a machine with gestures that he is adapted to in a society. Since these human gestures are natural just as those used in real life, these gestures may be encoded with cultural differences. Therefore, seemingly the same gestures may have different meanings in different cultural backgrounds. For example, a simple gesture of "thumbs up" may mean "OK" in U.S., "money" in Japan, and "zero" in Indonesia. Thus, if natural gestures are used as command inputs without consideration in the context of cultural differences, the business software application may misinterpret the simple "thumbs up" gesture.

Business software applications usually may operate under a certain operating environment which may include globally setting certain configurations of the device on which it runs. For example, a SAP Business Object (BO) may allow a global setting to a certain language such as English or Germany. However, when natural gestures are used as the input, an entirely new layer of global setting mechanism may be needed to adapt the computer system for the gesture inputs based on cultural differences.

SUMMARY OF INVENTION

Embodiments of the present invention may include a method of configuring a device to receive gesture inputs of a particular culture. The method may provides responsive to a user request to adapt a device to gestures of a culture, assigning a data record representing cultural setting of the device to the culture, and responsive to the assigning the culture setting of the device, adopting a gesture recognizer of the device to the culture setting.

BRIEF DESCRIPTION OF THE DRAWINGS OF THE EXAMPLE EMBODIMENTS

DETAILED DESCRIPTION OF THE EXAMPLE EMBODIMENTS

Gesture recognition and global gesture setting may be realized via a device such as a computer system. Exemplary gesture commands may be recorded using sensors for each cultural background that is needed for software applications. The cultural backgrounds may be grouped according to geographical regions such as a user's nationality or according to the user's ethnicity. Computerized models for gestures of different cultural backgrounds may be built from the recorded gesture commands. For example, using statistical training methods, a computerized model for gestures commonly used by a user from the United States may be built. Thus, based on demand, a number of computerized gesture models, each corresponding to a particular culture, may be built and then stored in a storage. When a user is identified as having a particular cultural background, the computer system may associate an automatic gesture recognizer with the computerized model for that particular cultural background. The gesture recognizer may then be used for recognizing gesture commands.

Figure 1:
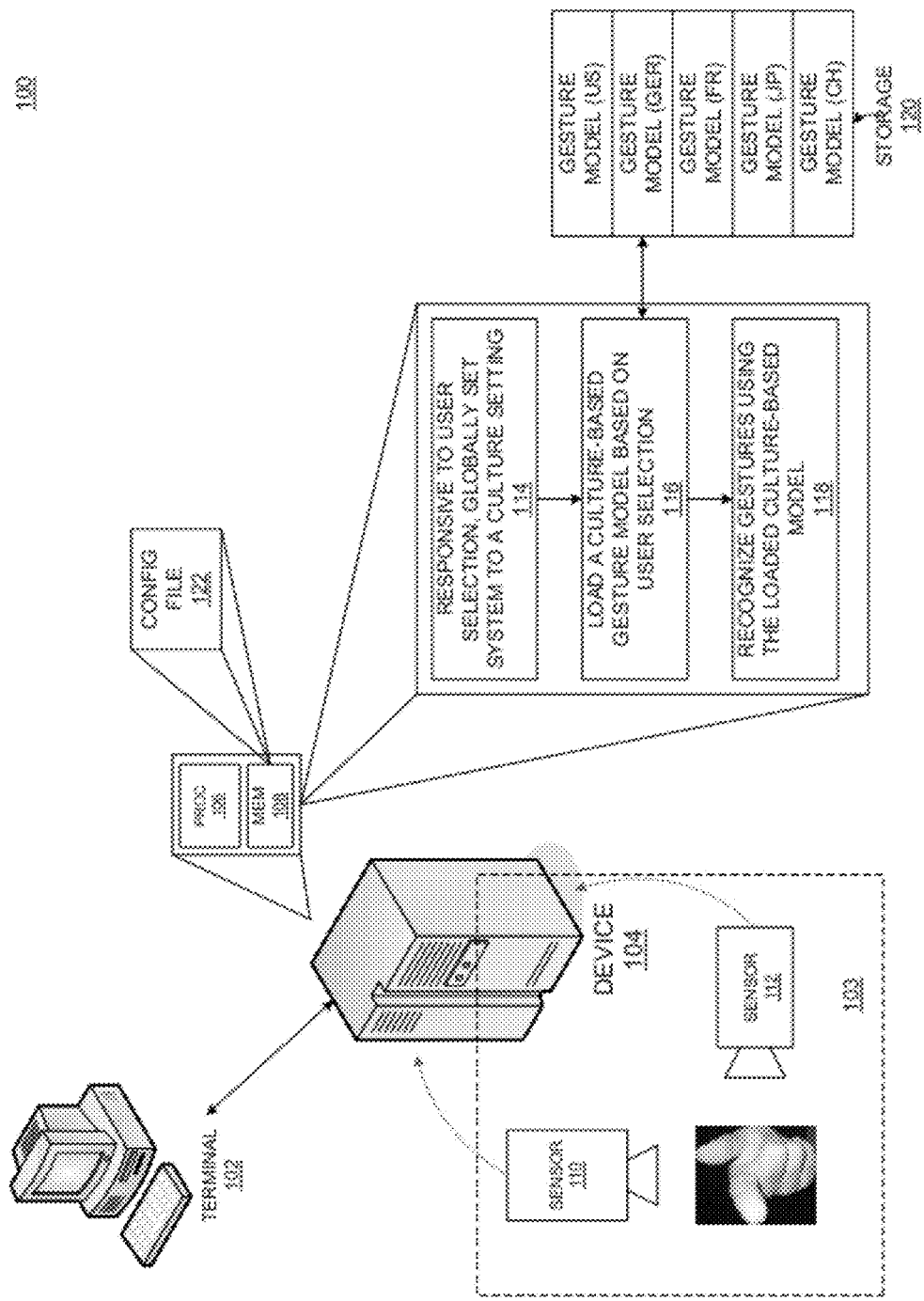
FIG. 1 illustrates a system including a culture-based gesture setting according to an exemplary embodiment of the present invention.

FIG. 1 illustrates a system 100 including a culture-based gesture setting according to an embodiment of the present invention. The system 100 may include a device 104 that may include a first input terminal 102, a second gesture input terminal 103, a processor 106, and a memory 108. The first input terminal 102 may include a keyboard, a mouse, or a touch screen (not shown) for a user to input instructions and data to the device 104. The second input terminal 103 may include sensors 110, 112 for capturing human gestures. The memory 108 may store code executable by the processor 106. In addition, the memory also may store a system configuration file 122 that may specify configurations of the device 104. Exemplary configurations may include language setting, time zone setting, user login files, and cultural settings for gestures. The system further may includes a storage 120 to store models each being trained for a particular culture. These models of different cultures may be selectively loaded by the processor 106 to work collaboratively with a gesture recognizer.

Figure 3:
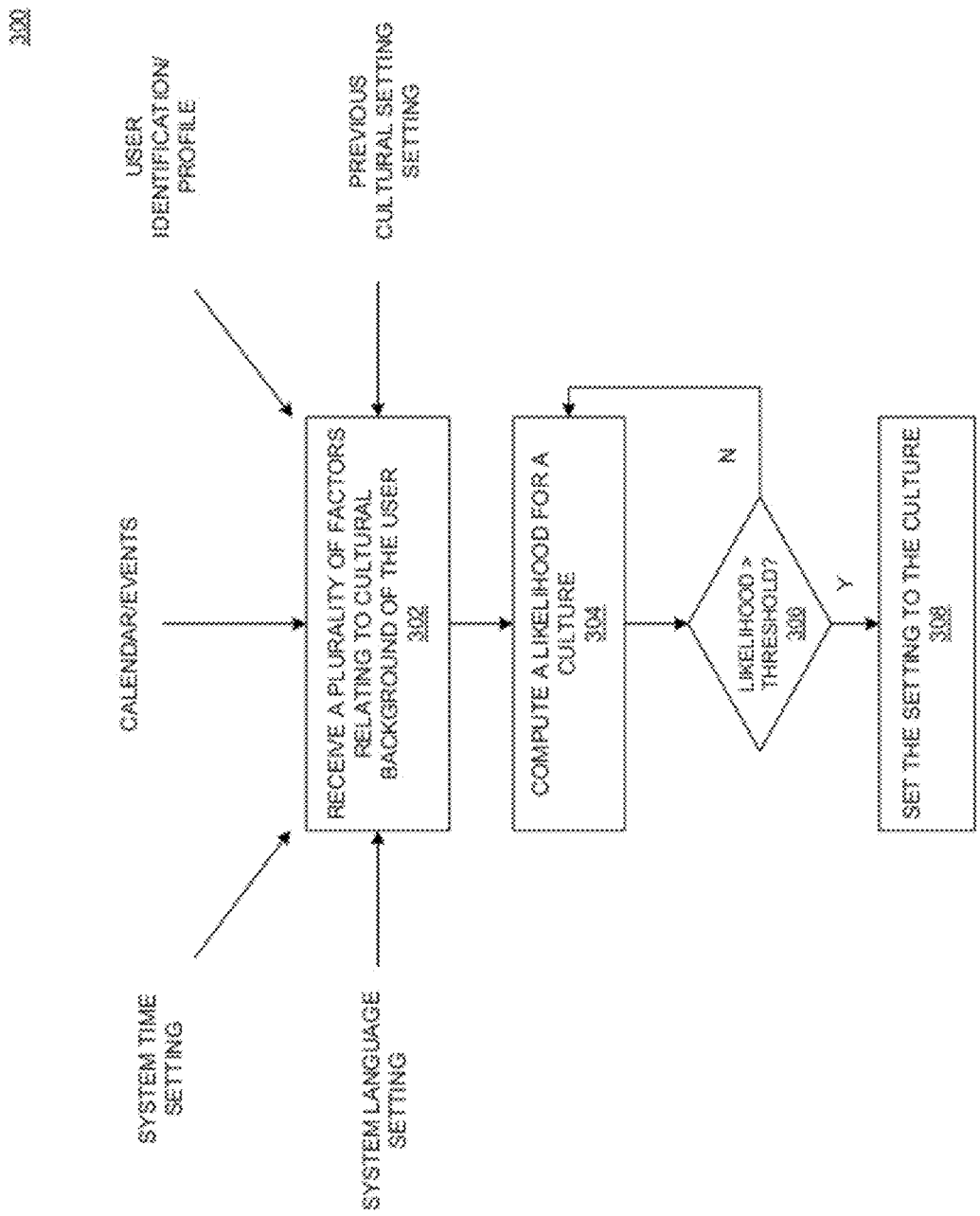
FIG. 3 illustrates a method of determining the culture-based setting from a set of factors according to an exemplary embodiment of the present invention.

A user may interact with the device 104 via the first input terminal 102 to achieve a number of objectives. In one example embodiment, the user may specify configurations of the device 104 via a user interface displayed on the first input terminal 102 to a particular cultural setting. The cultural setting may be a data record that may be part of and/or linked to a configuration file of the device 104. FIG. 3 illustrates a configuration file that includes records of gesture settings according to an exemplary embodiment of the present invention.

Figure 2:
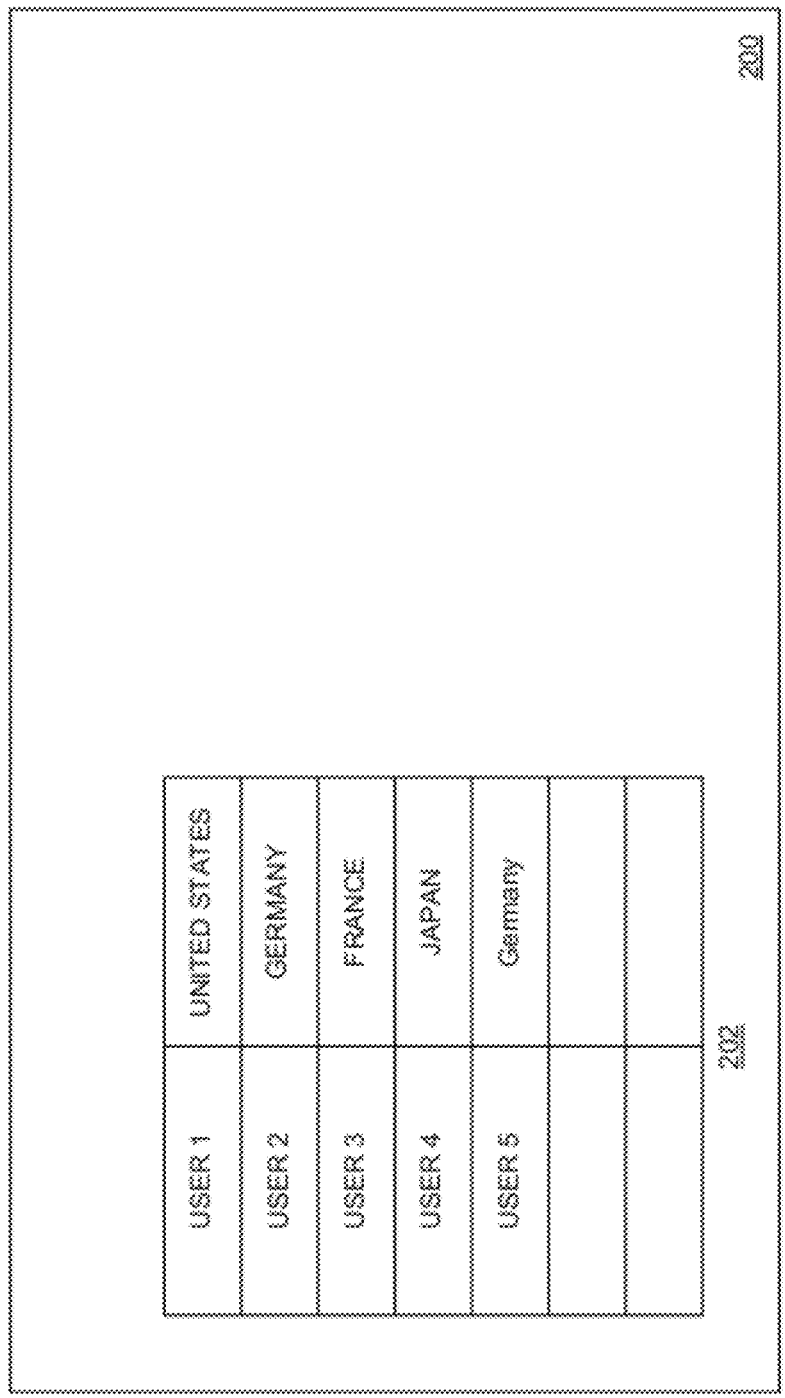
FIG. 2 illustrates a configuration file including records of gesture setting according to an exemplary embodiment of the present invention.

Referring to FIG. 2, a configuration file 200 may be a data record that may specify how the device 104 operates. The configuration file 200 may be a global data record in the sense that it may affect the operation of all applications running on the device 104. In one embodiment, the configuration file 200 may be a data record that includes multiple sub-records such as sub-records for language setting, time zone setting, user login files, and cultural setting for gestures. In this exemplary embodiment, the sub-record 202 of cultural settings for gestures may further include a plurality of data fields, each of the data fields being associated with one user identification (for example, USER 1 to USER 5) and correspondingly a cultural setting (for example, United States, Germany, France, Japan) so that when a user is identified to the device 104, the corresponding cultural setting may be retrieved conveniently through the user identifications. For example, a user may log into the device 104 and thus identify himself with a user identification. The device 104 may retrieve the configuration file 200 and thus associate the user with a pre-identified cultural background.

The sub-record 202 of cultural settings for gestures may be entered and/or modified by a user via a user interface. For example, a user may edit the cultural settings via word editor from the first input terminal 102. Alternatively, the user may modify the cultural settings via a GUI displaying a number of selections from which the user may choose a particular cultural setting.

In one exemplary embodiment of the present invention, a user may create and record a set of gestures, name the created set of gestures as a new "culture," and add the newly created "culture" of the user as a category of cultural background that may be used as cultural settings. For example, the user may refine or modify gestures of an existing culture and create a new variation of gestures of the existing culture. The user may use touch screens and/or cameras to record the new variations of gestures and train a gesture recognizer using the same. Then, the user may add a new cultural setting category that may correspond to the new variation of the gestures. The new cultural setting category may then be used as any other existing cultural backgrounds.

FIG. 2 illustrates an embodiment in which the cultural setting is associated with the device 104 globally to apply to all applications running on the device 104. In other embodiments, the cultural setting may have finer granularity to the level of applications. For example, the sub-record 202 of cultural settings for gestures may further include a data field for software applications (not shown) so that the cultural setting is specified as applied only to that particular piece of software.

Referring back to FIG. 1, the device 104 also may be coupled to a second input terminal 103 for gesture inputs. The second input terminal may include sensors 110, 112, such as video cameras, for capturing gestures in the form of electronic signals. These electronic signals may be fed to a gesture recognizer executed by processor 106 for gesture recognition. As discussed above, cultural differences may vary human gestures and their interpretations. Therefore, models for different cultural backgrounds may be trained from samples of human gestures from different cultures and stored in a storage 120. As exemplarily illustrated in FIG. 1, the storage 120 may store gesture models of United States, Germany, France, Japan, and China. This example is for illustration purpose. Other classifications of cultural backgrounds also may be possible and implemented.

During operation, at 114, a user may, through a user interface, enter and/or modify a cultural setting in a data record contained a configuration file of the device 104 and thus configure the device 104 to that particular cultural setting. Responsive to configuration of the device 104 to the particular cultural setting, a processor 106 of the device 104 may execute a gesture recognizer and load a gesture model of the culture in accordance with the cultural setting as specified by the configuration file. Further, device 104 may receive electronic signals captured from sensors 110, 112. These electronic signals representing user's gesture inputs may be analyzed by the culture-dependent gesture recognizer to recognize gesture inputs such as commands to software applications.

FIG. 1 illustrates an exemplary embodiment in which the cultural setting is directly specified by a user. In other embodiments, the cultural setting of a device may be configured automatically and implicitly based on a number of configuration parameters of the device. FIG. 3 illustrates a method of determining the culture-based setting from a set of factors according to an exemplary embodiment of the present invention. A device may have been previously configured with a set of parameters that may be related to or reflect the cultural background of its users. A cultural setting for gesture may be derived from these parameters. For example, the device may have been configured with a language setting, a time zone setting, a calendar/event setting, a user profile, and/or a history record of a previous cultural setting. Any one of these factors may provide information relevant to the determination of the cultural setting for the device. For example, in one exemplary embodiment, the cultural setting for the device may be specified according to the system language setting. Therefore, if the language setting is Japanese, the cultural setting may be set to Japan. However, the determination of the cultural setting of device based on a single factor may not be reliable. For example, if the language setting is English, it may not be reliable to set the cultural setting to a particular culture since English is used as the official language by many cultures.

FIG. 3 illustrates an exemplary embodiment in which multiple factors are taken into consideration to automatically determine the cultural setting of a device. At 302, a processor in the device may retrieve a plurality of parameters relating to the determination of cultural setting for gesture recognition. The parameters may respectively represent factors such as "system language setting," "system time setting," "calendar events," "user identification/profile," "previous cultural setting." Based on these parameters, at 304, the processor may compute a likelihood that a user may be associated with a particular culture. The likelihood computation may be based on known statistical methods such as maximum likelihood method, neural network, and fuzzy logic. Responsive to the computed likelihood of a particular culture, at 306, the likelihood may be compared to a pre-determined threshold value. If the likelihood value is greater than the pre-determined threshold value, the processor may, at 308, set the cultural setting for the device to the particular culture. However, if the likelihood is equal to or is less than the threshold value, the processor may similarly compute the likelihood for a second culture and repeat the process for the second culture. This process may continue until all cultures are checked.

The process to determine a cultural setting may be triggered in response to user actions. In one exemplary embodiment, a user logs into a system may trigger the execution of a script to determine the cultural setting of the device for the particular user. In another exemplary embodiment, the start of a software application that accepts gesture inputs may trigger the execution of a script to determine the cultural setting of the device for the particular piece of software application.

In another exemplary embodiment, the cultural setting may be triggered by a gesture that may be ambiguous in the context of different cultures. For example, a default gesture recognizer may operate until a gesture that may be subject to different interpretations in different cultural backgrounds is detected. In response to this gesture by the user, a system of the present invention may display a selection of candidate cultures via a GUI (e.g., a dialogue box) to ask the user's cultural background. In response to a selection of a culture on the GUI by the user, the system may be automatically set to that cultural setting. Further, the gesture recognizer may be adopted to the newly adopted cultural setting.

Although the present invention has been described with reference to particular examples and embodiments, it is understood that the present invention is not limited to those examples and embodiments. Further, those embodiments may be used in various combinations with and without each other. The present invention as claimed therefore includes variations from the specific examples and embodiments described herein, as will be apparent to one of skill in the art.

What is claimed is:

1. A computer-implemented method of configuring a device to receive gesture inputs of a particular culture, comprising:
    retrieving parameter data of the device, the parameter data including at least one of a language setting, a time zone setting, a calendar event setting, and a history record of a previous cultural setting of the device;
    computing a likelihood value of a culture based on the parameter data, the likelihood value indicating a probability that a user of the device belongs to the culture;
    comparing the computed likelihood value of the culture with a pre-determined threshold;
    if the likelihood value of the culture is greater than the pre-determined threshold, assigning a data record representing a cultural setting of the device to the culture, wherein the data record includes a user identification field holding an identification of the user of the device, and a cultural setting field corresponding to the user identification and storing a cultural value representing the culture; and
    if not greater, computing a next likelihood value of another culture based on the parameter data and repeating the comparing step; and
    responsive to the assigning the cultural setting of the device, adopting a gesture recognizer of the device to the cultural setting.

2. The method of claim 1, wherein the adopting the gesture recognizer includes:
    loading a gesture model of the culture; and
    recognizing gestures using the gesture recognizer based on the gesture model of the culture.

3. The method of claim 1, wherein the user request includes user's logging into the device which executes a login script to identify the user to the device.

4. The method of claim 1, wherein the user request includes user modifies the configuration file via a user interface.

5. The method of claim 1, wherein the device is one of a computer, a handheld device, a cell phone, and a game box.

6. A device, comprising:
    a processor configured with a culture-based gesture recognizer; and
    a memory having stored thereon a configuration file that specifies how the device operates,
    wherein the processor is configured to:
        retrieve parameter data of the device, the parameter data including at least one of a language setting, a time zone setting, a calendar event setting, and a history record of a previous cultural setting of the device;
        compute a likelihood value of a culture based on the parameter data, the likelihood value indicating a probability that a user of the device belongs to the culture;
        compare the likelihood value of the culture with a pre-determined threshold;
        if the likelihood value of the culture is greater than the pre-determined threshold, assign a data record representing cultural setting in the configuration file to the culture, wherein the data record includes a user identification field holding an identification of the user of the device, and a cultural setting field corresponding to the user identification and storing a cultural value representing the culture; and
        if not greater, compute a next likelihood value of another culture based on the parameter data and repeat the comparing step; and
        responsive to the assigning the cultural setting, adopting the gesture recognizer of the device to the culture setting.

7. The device of claim 6, wherein the adopting the gesture recognizer includes:
    loading a gesture model of the culture; and
    recognizing gestures using the gesture recognizer based on the gesture model of the culture.

8. The device of claim 6, wherein the user request includes user's logging into the device which executes a login script to identify the user to the device.

9. The device of claim 6, wherein the user request includes user modifies the configuration file via a user interface.

10. The device of claim 6, wherein the device is one of a computer, a handheld device, a cell phone, and a game box.

11. A computer-readable non-transitory medium stored thereon machine-executable codes that, when executed, performs a method of configuring a device to receive gesture inputs of a particular culture, the method comprising:
    retrieving parameter data of the device, the parameter data including at least one of a language setting, a time zone setting, a calendar event setting, and a history record of a previous cultural setting of the device;
    computing a likelihood value of a culture based on the parameter data, the likelihood value indicating a probability that a user of the device belongs to the culture, wherein the data record includes a user identification field holding an identification of the user of the device, and a cultural setting field corresponding to the user identification and storing a cultural value representing the culture;
    comparing the computed likelihood value of the culture with a pre-determined threshold;
    if the likelihood value of the culture is greater than the pre-determined threshold, assigning a data record representing a cultural setting of the device to the culture; and
    if not greater, computing a next likelihood value of another culture based on the parameter data and repeating the comparing step; and
    responsive to the assigning the cultural setting of the device, adopting a gesture recognizer of the device to the cultural setting.

* * * * *